United States Patent
Itogawa

(10) Patent No.: US 8,419,146 B2
(45) Date of Patent: Apr. 16, 2013

(54) IMAGE RECORDING APPARATUS

(75) Inventor: Yoshihiro Itogawa, Gifu-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 348 days.

(21) Appl. No.: 12/955,453

(22) Filed: Nov. 29, 2010

(65) Prior Publication Data

US 2011/0157265 A1 Jun. 30, 2011

(30) Foreign Application Priority Data

Dec. 29, 2009 (JP) ................................ 2009-299084

(51) Int. Cl.
*B41J 29/38* (2006.01)

(52) U.S. Cl.
USPC ............................................................ 347/9

(58) Field of Classification Search ...... 347/9; 382/221, 382/299, 181; 358/3.03; 715/801
See application file for complete search history.

(56) References Cited

U.S. PATENT DOCUMENTS

| | | | | |
|---|---|---|---|---|
| 5,109,432 A | * | 4/1992 | Hori et al. ...................... | 382/221 |
| 7,222,306 B2 | * | 5/2007 | Kaasila et al. ................. | 715/801 |
| 7,457,465 B2 | * | 11/2008 | Tomiyama et al. ........... | 382/181 |
| 2002/0039456 A1 | * | 4/2002 | Miura et al. ................... | 382/299 |
| 2002/0070990 A1 | | 6/2002 | Yamasaki et al. | |
| 2003/0147091 A1 | | 8/2003 | Otokita | |
| 2006/0055980 A1 | * | 3/2006 | Takahashi et al. ........... | 358/3.03 |

FOREIGN PATENT DOCUMENTS

| | | |
|---|---|---|
| JP | H03-180349 A | 8/1991 |
| JP | 2002-292848 A | 10/2002 |
| JP | 2003-191456 A | 7/2003 |
| JP | 2005-153157 A | 6/2005 |
| JP | 2005-199608 A | 7/2005 |
| JP | 2005-324459 A | 11/2005 |
| JP | 2009-039880 A | 2/2009 |

* cited by examiner

*Primary Examiner* — Stephen Meier
*Assistant Examiner* — Carlos A Martinez
(74) *Attorney, Agent, or Firm* — Baker Botts L.L.P.

(57) ABSTRACT

An image recording apparatus of the present invention includes an image data storage unit, a record head, a head controller, an image data changing unit, an edge detection unit, a thin-line image portion judging unit, and a thin-line blank region judging unit. The image data changing unit changes an image data such that an amount of reduction in a recording droplets ejected onto a region including a dot region where an image dots constituting at least an edge of a thin-line image portion are formed is large when the thin-line image portion neighbors a thin-line blank region, as compared to a case where the thin-line image portion does not neighbor the thin-line blank region.

11 Claims, 9 Drawing Sheets

IMAGE RECORDING APPARATUS

CROSS REFERENCE TO RELATED APPLICATION

The present application claims priority from Japanese Patent Application No. 2009-299084, which was filed on Dec. 29, 2009, the disclosure of which is herein incorporated by reference in its entirety.

BACKGROUND OF THE INVENTION

1. Field of the Invention

The present invention relates to an image recording apparatus which records an image on a recording medium by ejecting recording droplets thereon.

2. Description of Related Art

An image recording apparatus such as an inkjet printer, for example, has a record head which ejects recording droplets onto a recording medium so as to record an image thereon. In connection with image recording by the image recording apparatus, an edge treatment may be carried out to reduce an amount of recording droplets ejected onto the vicinity of the edges of the image so that the recording droplets do not bleed at the edge portions of the image.

Such an image recording apparatus performing the above-described edge treatment may be disadvantageous in that, when a thin-line image portion which is a relatively thin line is formed, the line become thinner on account of the edge treatment, with the result that the thin-line image portion is not clearly printed. In this regard, there has been a known image recording apparatus which performs a control such that the edge treatment is not carried out when a thin-line image portion is formed. This apparatus makes it possible to prevent a thin-line image portion from being unclear on account of the thinning of the line, while restraining in the portions other than the thin-line image portion the deterioration of the image quality on account of the bleeding of recording droplets at the edge portions.

SUMMARY OF THE INVENTION

Now, assume a case where a thin-line blank region which is a black region not receiving recording droplets and is relatively narrow neighbors a thin-line image portion. In this case, when the edge treatment is not carried out in the thin-line image portion as described above, the recording droplets at the edge portions of the thin-line image portion bleed into the neighboring thin-line blank region so that the thin-line blank region is blurred. This deteriorates the image quality.

An object of the present invention is to provide an image recording apparatus which can produce images in which the image quality of thin-line image portions is high.

According to an aspect of the present invention, an image recording apparatus includes: an image data storage unit which stores image data regarding an image recorded on a recording medium; a record head which records the image by ejecting recording droplets onto the recording medium; a head controller which controls ejection of the recording droplets from the record head based on the image data stored in the image data storage unit so that image dots are formed as the recording droplets are ejected onto the recording medium; an image data changing unit which changes the image data stored in the image data storage unit so that an amount of the ejected recording droplets is reduced; an edge detection unit which detects an edge of the image concerning the image data; a thin-line image portion judging unit which judges that a portion in the image which portion is not wider than a first predetermined length in a direction orthogonal to the extending direction of the edge detected by the edge detection unit is a thin-line image portion; and a thin-line blank region judging unit which judges that a blank region which neighbors an edge of the thin-line image portion and does not receive the recording droplets is a thin-line blank region when the blank region is not wider than a second predetermined length in a direction orthogonal to the extending direction of the edge of the thin-line image portion, wherein, the image data changing unit changes the image data such that an amount of reduction in the recording droplets ejected onto a region including a dot region where the image dots constituting at least the edge of the thin-line image portion are formed is large when the thin-line image portion neighbors the thin-line blank region, as compared to a case where the thin-line image portion does not neighbor the thin-line blank region.

In addition to the above, a computer program product of the present invention is able to cause a computer to conduct the above-described functions, and is stored in a computer-readable recording medium. The recording medium is non-transitory, and examples thereof include removable recording media such as a flexible disc (FD), a CD-ROM (Compact Disc Read Only Memory), and a memory card and fixed recording media such as a hard disc.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

The following will describe a preferred embodiment of the present invention with reference to figures.

Figure 1:
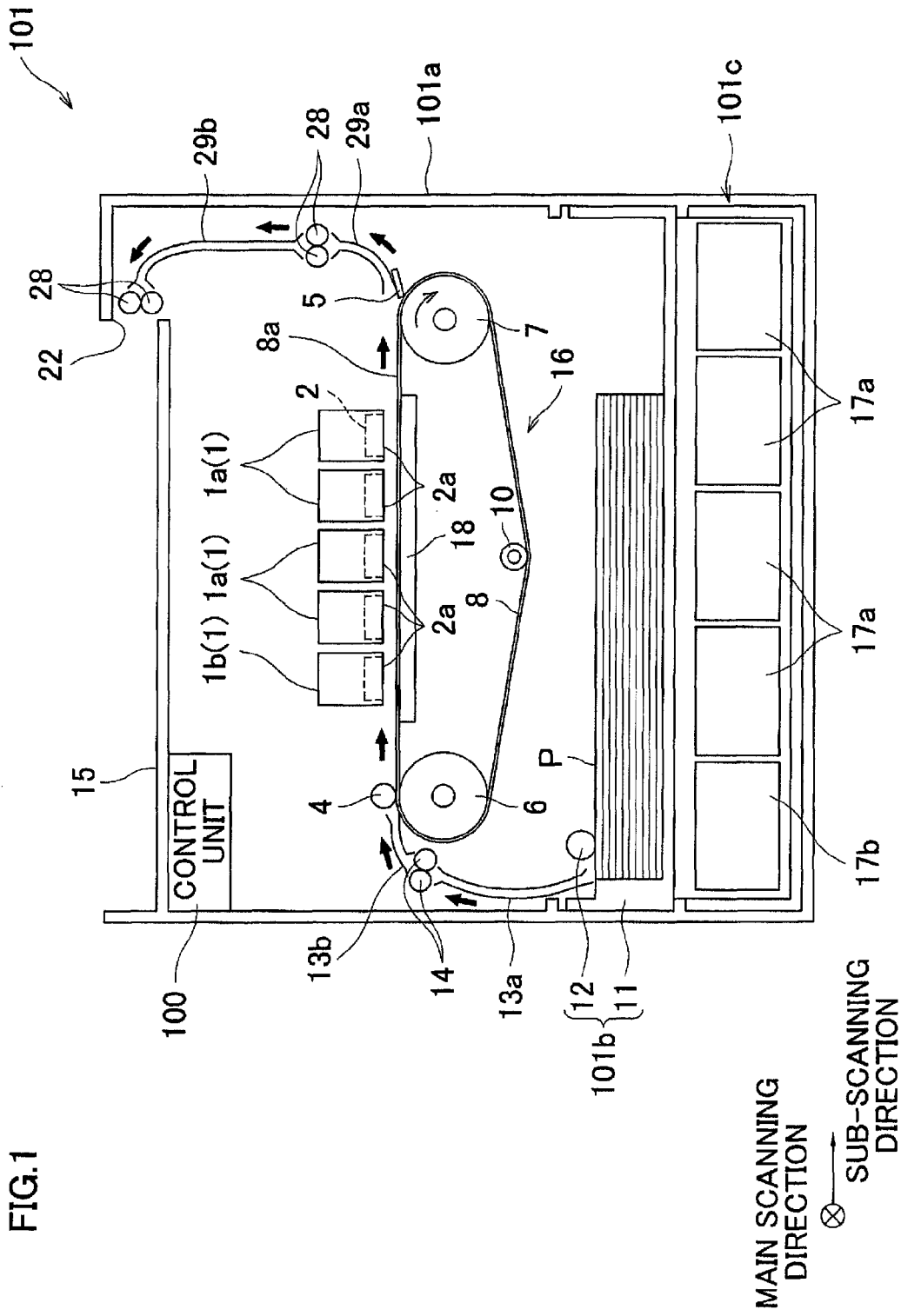
FIG. 1 is a schematic profile showing the overall arrangement of an inkjet printer according to an embodiment of the present invention.

As shown in FIG. 1, an inkjet printer 101 of the present embodiment has a substantially rectangular parallelepiped chassis 101a. In the chassis 101a are provided, from the above, five heads 1, a conveyor mechanism 16, conveying sheets P, a sheet supply unit 101b, supplying sheets P, and a tank unit 101c storing ink. At a position not interfering with these mechanical units, a control unit 100 is provided to control the operations of the mechanical units. Furthermore, on the top plate of the chassis 101*a* is provided a sheet ejection unit 15 where sheets P are ejected.

Four out of five heads 1 are record heads 1*a* which eject cyan, magenta, yellow, and black ink droplets, respectively, as recording droplets. The remaining one head 1 is a processing liquid ejection head 1*b* which ejects a processing liquid. It is noted that the record heads 1*a* and the processing liquid ejection head 1*b* are substantially identical in terms of structure. The processing liquid ejection head 1*b* is provided upstream of the four record heads 1*a* in the conveyance direction of sheets P by the conveyor mechanism 16. The processing liquid is applied to each sheet P in advance to restrain later-applied ink from infiltrating into the sheet P. This makes it easy to fixing ink on the sheet P.

Each of the five heads 1 has a rectangular parallelepiped shape and long in the main scanning direction, and these heads 1 are fixedly aligned in the conveyance direction of sheets P by the conveyor mechanism 16. This indicates that the printer 101 is a line-type printer. The main scanning direction of the printer 101 is orthogonal to the conveyance direction of sheets P and in parallel to the horizontal plane. The sub-scanning direction is in parallel to the conveyance direction of sheets P.

Figure 3:
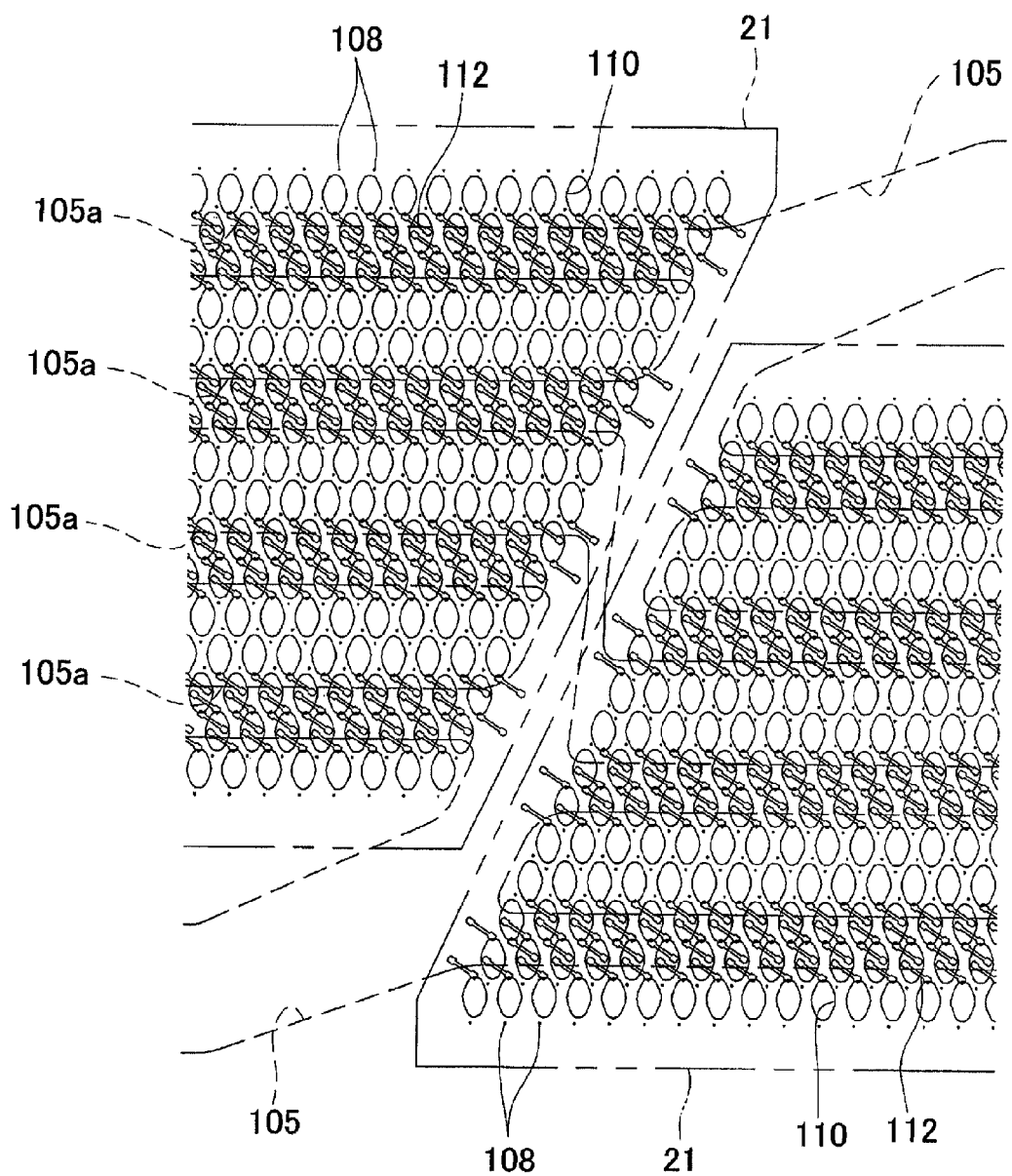
FIG. 3 is an enlarged view of the region enclosed by the dashed line in FIG. 2.

Each head 1 is provided with a head main body 2 having a plurality of ejection openings 108 shown in FIG. 3. The ejection openings 108 are formed on an ejection surface 2*a* which is the lower surface of the head main body 2. The ejection surface 2*a* opposes a conveyed sheet P with a predetermined distance therebetween. Each ejection opening 108 ejects ink or a processing liquid under the control of the control unit 100.

The conveyor mechanism 16 has two belt rollers 6 and 7, a conveyor belt 8, a tensioning roller 10, and a platen 18. The conveyor belt 8 is an endless belt stretched between the rollers 6 and 7, and is tensioned by the tensioning roller 10. The platen 18 is provided in the region circumscribed by the conveyor belt 8, and forms a gap suitable for image formation with the heads 1 and supports the conveyor belt 8. The belt roller 7 is a drive roller rotated clockwise in FIG. 1 by an unillustrated motor, and moves the conveyor belt 8. The belt roller 6 is a driven roller rotated by the movement of the conveyor belt 8. As such, the conveyor mechanism 16 is able to move a sheet P on the conveyor belt 8 in the conveyance direction which is from the left to the right in FIG. 1.

The sheet supply unit 101 b is arranged to be detachable to the chassis 101*a*, and has a sheet feeding tray 11 and a sheet feeding roller 12. The sheet feeding tray 11 is an open-top box in which sheets P are stacked. The sheet feeding roller 12 sends out, under the control of the control unit 100, the topmost sheet P in the sheet feeding tray 11. The sheet P having been sent out is conveyed to the conveyor mechanism 16 by the feed roller pair 14, along guides 13*a* and 13*b*.

The tank unit 101*c* includes therein four ink tanks 17*a* and a single processing liquid tank 17*b*. The ink tanks 17*a* and the processing liquid tank 17*b* are arranged to be detachable to the tank unit 101*c*. The ink tank 17*a* store cyan, magenta, yellow, and black inks, respectively. The ink stored in each ink tank 17*a* is supplied to the record head 1*a* ejecting the ink of the corresponding color, via an unillustrated ink tube. Similarly, the processing liquid tank 17*b* stores the processing liquid, and this processing liquid stored in the processing liquid tank 17*b* is supplied to the processing liquid ejection head 1*b*.

In the printer 101, as show in FIG. 1, a conveying passage is formed along the black arrows. As a whole, the conveying passage has a reverse S shape. Onto a sheet P supplied from the sheet supply unit 101*b*, the processing liquid and the inks are serially ejected under the control of the control unit 100, when the sheet P passes through the region below each of the five heads 1. In this way, a desired color image is formed on the upper surface of the sheet P. The sheet P on which the image has been formed is then sent out from the conveyor mechanism 16. Thereafter, the sheet P is conveyed to the region above the feed roller pair 28 along the guides 29*a* and 29*b*. The sheet P is then ejected to the sheet ejection unit 15 from a ejecting slot 22 formed at an upper region of the chassis 101*a*.

Now, the head main body 2 will be detailed with reference to FIG. 2 to FIG. 4. It is noted that FIG. 3 illustrates pressure chambers 110, apertures 112, and ejection openings 108 below an actuator unit 21 by full lines even when they should have been illustrated by dotted lines, for ease of explanation.

Figure 2:
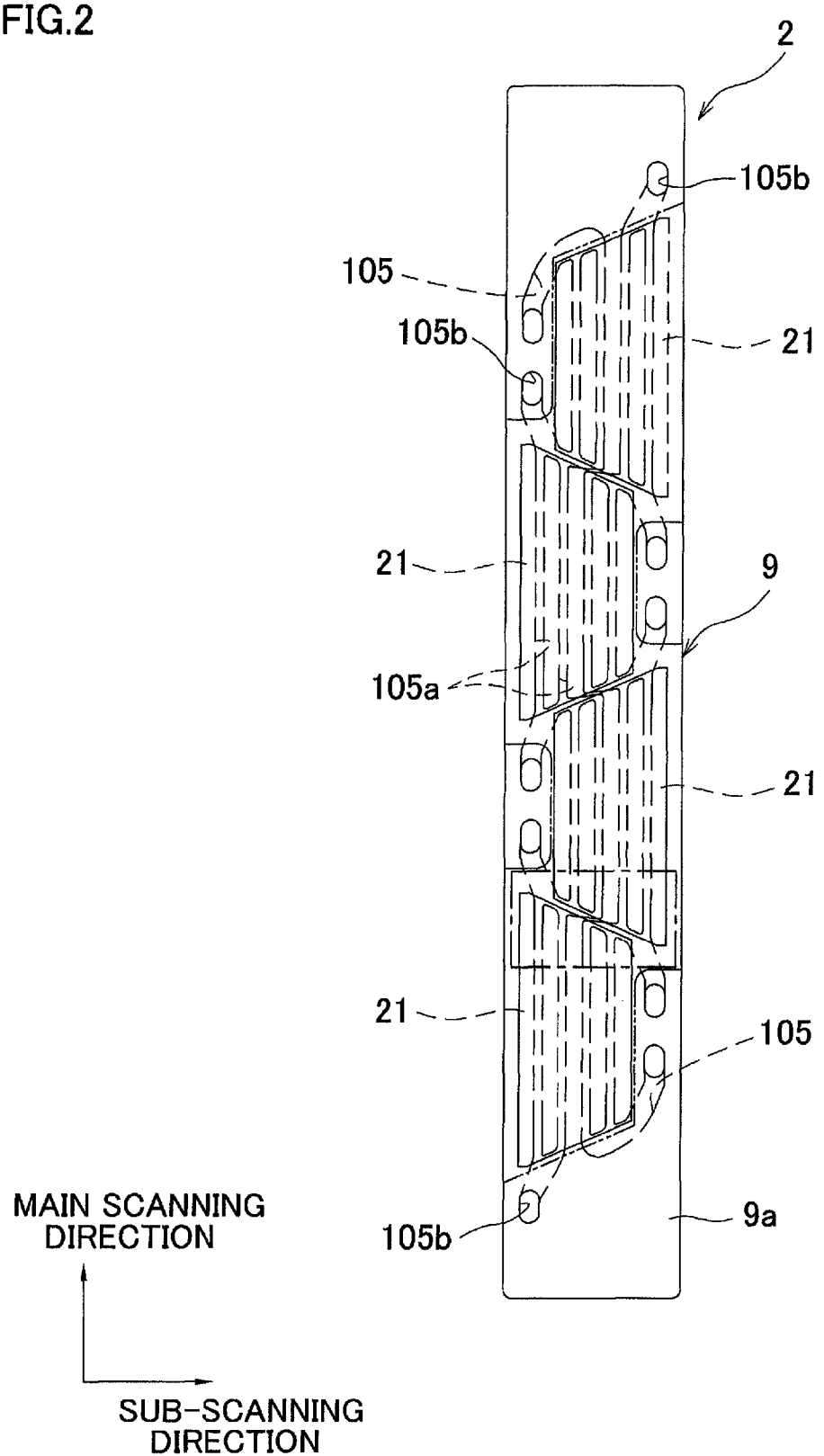
FIG. 2 is a plan view of the head main body shown in FIG. 1.

The head main body 2 is, as shown in FIG. 2, a laminated body in which four actuator units 21 are fixed to the upper surface 9*a* of the passage unit 9. Although no illustrations are given, each of the record heads 1*a* and the processing liquid ejection head 1*b* includes components such as a reservoir unit, a flexible printed circuit (Flexible Printed Circuit: FPC) and a control substrate, in addition to the head main body 2. The reservoir unit stores ink or processing liquid supplied to the passage unit 9. The FPC outputs a drive signal to the actuator units 21. The control substrate controls a driver IC mounted in the FPC.

Figure 4:
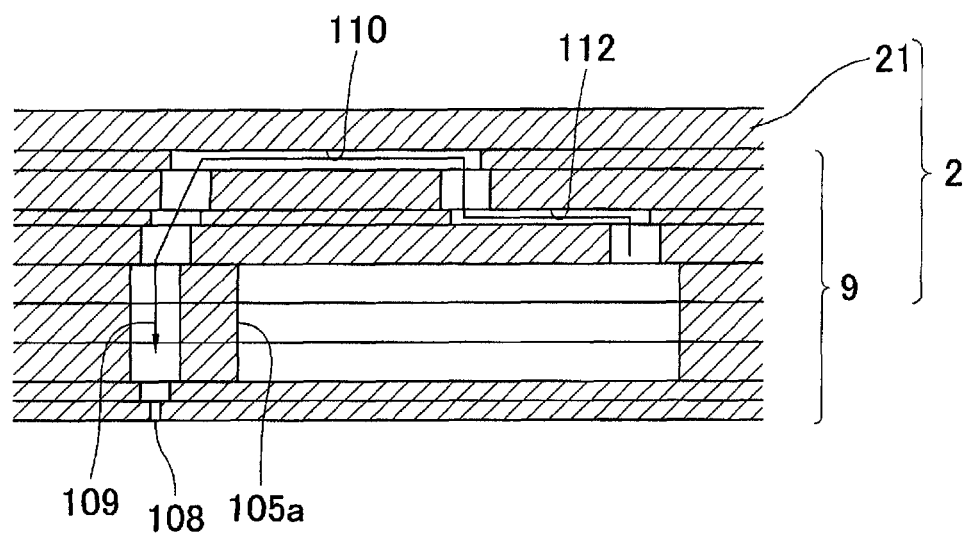
FIG. 4 is a partial cross section of the head main body shown in FIG. 2.

As shown in FIG. 4, the passage unit 9 is a laminated body in which a plurality of stainless steel plates are aligned with one another. In the passage unit 9 are formed a manifold passage 105 and sub-manifold passages 105*a* shown in FIG. 2 and FIG. 3 and a plurality of individual ink flow passages 109 show in FIG. 4. The sub-manifold passages 105*a* are branched from one manifold passage 105. The individual ink flow passages 109 connect the ejection opening holes of the respective sub-manifold passages 105*a* with the ejection openings 108 via the apertures 112 and the pressure chambers 110. The actuator unit 21 includes a plurality of actuators corresponding to the pressure chambers 110, respectively, and selectively imparts an ejection energy to the ink in the pressure chamber 110.

As shown in FIG. 2, the upper surface 9*a* of the passage unit 9 has ten ink supply openings 105*b* corresponding to the ink outflow passage of the reservoir unit. The lower surface of the passage unit 9 functions as an ejection surface 2*a*, and has many ejection openings 108 provided in a matrix manner. The ejection openings 108 are aligned in the main scanning direction at 600 dpi which is a main scanning direction resolution.

The head 1 having the head main body 2 described above is controlled by a later-described head controller 31 in regard to its ejection intervals of ink or processing liquid such that ink or processing liquid droplets ejected from the ejection openings 108 impact the sheet P at 600 dpi intervals in the sub-scanning direction. In other words, the main scanning direction resolution and the sub-scanning direction resolution are both 600 dpi in the present embodiment. As a result, on the sheet P, a plurality of dot regions are formed in a matrix manner at 1/600 inch intervals, in both the main scanning direction and the sub-scanning direction.

Figure 5:
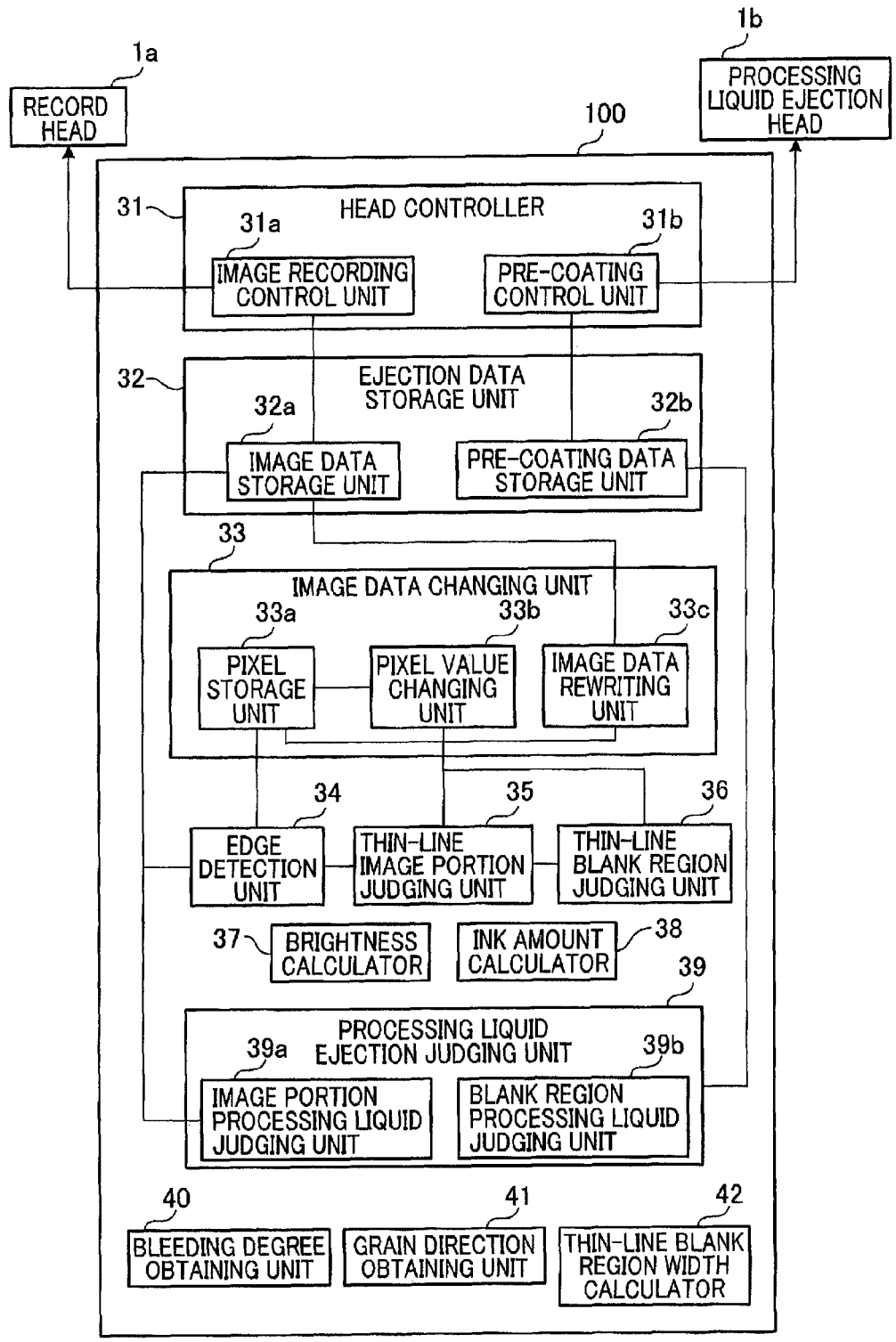
FIG. 5 is a functional block diagram of the control unit shown in FIG. 1.

Now, referring to FIG. 5, the control unit 100 will be described. The control unit 100 is structured in a personal computer (PC) having a CPU (Central Processing Unit), an EEPROM (Electrically Erasable and Programmable Read Only Memory) storing programs executed by the CPU and data used by the programs in a rewritable manner, a RAM (Random Access Memory) which temporarily stores data when a program is executed, and a HDD (Hard Disk Drive). The program of the present invention is stored in a recording medium such as a flexible disc, a CD-ROM, and a memory card, and is installed into the EEPROM from the recording medium. As the CPU runs the program, the function units constituting the control unit 100 shown in FIG. 5 are realized. The program stored in the recording medium may be directly run by the control unit 100 or may become runnable after being installed in the EEPROM. The program may be encoded or compressed.

As shown in FIG. 5, the control unit 100 includes a head controller 31, an ejection data storage unit 32, an image data changing unit 33, an edge detection unit 34, a thin-line image portion judging unit 35, a thin-line blank region judging unit 36, a brightness calculator 37, an ink amount calculator 38, a processing liquid ejection judging unit 39, a bleeding degree obtaining unit 40, a grain direction obtaining unit 41, and a thin-line blank region width calculator 42.

The head controller 31 controls the driving of the actuators in the actuator units 21 of each head 1. The head controller 31 includes an image recording control unit 31a which controls the actuators of the record head 1a and a pre-coating control unit 31b which controls the actuators of the processing liquid ejection head 1b. The image recording control unit 31a controls ink ejecting from the record heads 1a based on image data stored in a later-described image data storage unit 32a. In the present embodiment, the image recording control unit 31a adjusts an amount of ink ejected from each record head 1a in three stages, namely large droplets, middle-sized droplets, and small droplets. The processing liquid ejection head 1b controls the ejecting of processing liquid from the processing liquid ejection head 1b based on ejection data stored in a later-described pre-coating data storage unit 32b.

The ejection data storage unit 32 includes an image data storage unit 32a and a pre-coating data storage unit 32b, and is formed in a memory area of the RAM. The image data storage unit 32a stores image data which is transferred from a PC (Personal Computer) or the like connected to the inkjet printer 101 and relates to an image formed on a sheet P. The types of pixel values in image data are 3, 2, 1, and 0, which correspond to the ejection of large droplets, the ejection of middle-sized droplets, the ejection of small droplets, and no ink ejection, respectively. In the present embodiment, initial image data is arranged so that the pixel values of a plurality of pixels constituting an image all correspond to the value for the ejection of large droplets. The pre-coating data storage unit 32b stores the ejection data of the processing liquid ejected from the processing liquid ejection head 1b. In the present embodiment, the ejection data of the processing liquid is determined based on image data. More specifically, the ejection data is determined so that the processing liquid impacts a dot region where the ink ejected from the record heads 1a based on the image data will impact. In other words, the processing liquid is ejected to a region which is an image region where an image is to be formed.

The image data changing unit 33 changes the image data stored in the image data storage unit 32a so that an amount of ink ejected from the record heads 1a is reduced. The image data changing unit 33 includes a pixel storage unit 33a, a pixel value changing unit 33b, and an image data rewriting unit 33c. The pixel storage unit 33a is formed in a memory area of the RAM, and stores, as detailed later, edge pixels detected by the edge detection unit 34 or edge pixels and their surrounding pixels. The pixel value changing unit 33b changes the pixel value of the pixels stored in the pixel storage unit 33a from the value corresponding to the ejection of large droplets to the value corresponding to middle-sized droplets or small droplets. This pixel value changing unit 33b is realized by the operation of the CPU, and changes the pixel value of the pixels which are stored in the RAM as edge pixels or edge pixels and their surrounding pixels as described above. The image data rewriting unit 33c rewrites the image data stored in the image data storage unit 32a, based on the storage in the pixel storage unit 33a after being changed by the pixel value changing unit 33b. This image data rewriting unit 33c is realized by the operation of the CPU and rewrites the image data stored in the RAM as described above.

How much the amount of ejected ink is reduced by the image data changing unit 33 is judged based on the number of pixels stored in the pixel storage unit 33a and the degree of change in the pixel value by the pixel value changing unit 33b. The number of pixels stored in the pixel storage unit 33a and the degree of change in the pixel value by the pixel value changing unit 33b are, as described below, determined based on the judgment, calculation, and acquisition by the thin-line image portion judging unit 35, the thin-line blank region judging unit 36, the brightness calculator 37, the ink amount calculator 38, the processing liquid ejection judging unit 39, the bleeding degree obtaining unit 40, the grain direction obtaining unit 41, and the thin-line blank region width calculator 42.

The edge detection unit 34 is realized by the operation of the CPU, and detects an edge of an image corresponding to image data stored in the image data storage unit 32a. More specifically, based on image data, when a difference between the pixel values of two neighboring pixels is equal to or more than a threshold value, it is judged that an edge of the image exists between these two pixels. The pixel having the larger pixel value among the two pixels is detected as an edge pixel constituting the edge of the image corresponding to the image data, and is written into the pixel storage unit 33a of the image data changing unit 33. It is noted that the term "edge of image" in the present embodiment indicates the border line between an image formed by ink ejected from the record heads 1a and the background to which no ink is ejected.

The thin-line image portion judging unit 35 is realized by the operation of the CPU, and judges that a portion of an image which portion is equal to or shorter than a first predetermined length in the direction orthogonal to the extending direction of the edge detected by the edge detection unit 34 is a thin-line image portion. The first predetermined length is a length with which, when the edge treatment is conducted for an image to uniformly reduce an amount of ink ejected onto the edge and its surroundings, a part of the image where the edge treatment has been conducted looks thin. The first predetermined length is typically equivalent to one to eight pixels. In the present embodiment, the first predetermined length is equivalent to three pixels.

The judgment as to whether a thin-line image portion or not by the thin-line image portion judging unit 35 can be done by a known filtering process. Alternatively, the judgment is made as to whether the edge pixels detected by the edge detection unit 34 are successive. In other words, whether there are edge pixels successively neighboring one another in one direction is judged. For example, in a case of an outlined character image shown in FIG. 6A and FIG. 6B, among all edge pixels, the edge pixels circumscribed by the thick lines in FIG. 6A in the image are judged as successive edge pixels. Now, consider the pixels which are within the first predetermined length from the edge constituted by successive edge pixels in the direction orthogonal to the extending direction of the edge. In other words, consider the pixels within a range of three pixels from right to left in FIG. 6A from the edge constituted by successive edge pixels. When there is another edge pixel among the aforesaid pixels and no blank pixel where no ink is ejected is provided between the edge pixels, a portion in the image, which portion is framed by the edges constituted by the successive edge pixels, is judged as a thin-line image portion. In FIG. 6B, there is another edge which is away by the first predetermined length from the edge constituted by solid edge pixels, and there are no blank pixels between the edges. Therefore, in the image shown in FIG. 6B, the portion framed by the edge constituted by the solid edge pixels, i.e. the portion constituted by the solid edge pixels and the pixels circumscribed by the thick lines is deemed as a thin-line image portion.

The thin-line blank region judging unit 36 is realized by the operation of the CPU. The thin-line blank region judging unit 36 judges a blank region which neighbors an edge of the thin-line image portion and which does not receive ejected ink is a thin-line blank region when the width of that blank region in the direction orthogonal to the extending direction of the edge of the thin-line image portion is equal to or shorter than a second predetermined length. The second predetermined length is a length with which the blank region is blurred on account of ink bleeding when the edge treatment to reduce an amount of ink ejected around the edge is not carried out for the image. The second predetermined length is arranged to be about twice to four times longer than the degree of ink bleeding, and is typically equivalent to one to six pixels. In the present embodiment, the second predetermined length is equivalent to three pixels.

Figure 7A:
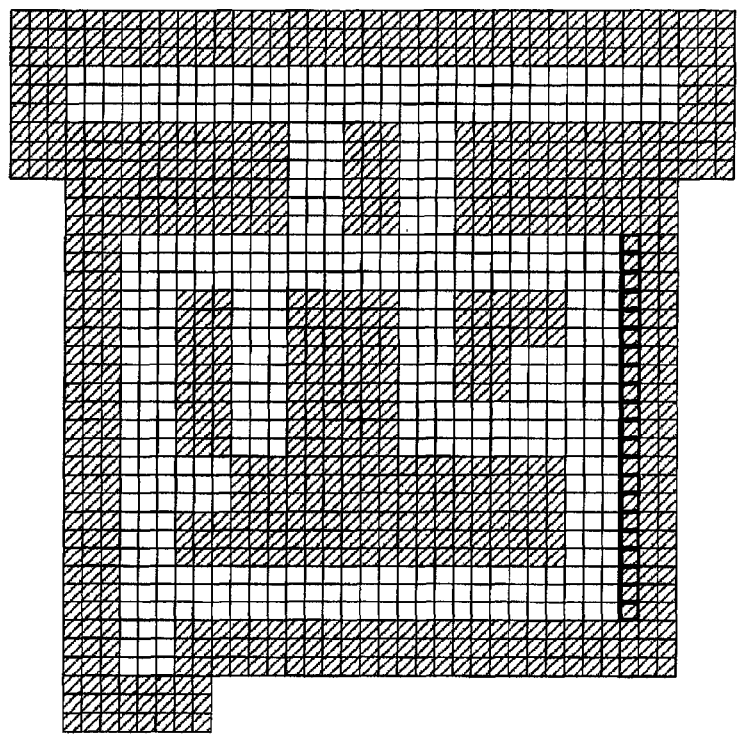
FIG. 7A illustrates how judgment is made by the thin-line blank region judging unit shown in FIG. 5.
Figure 7B:
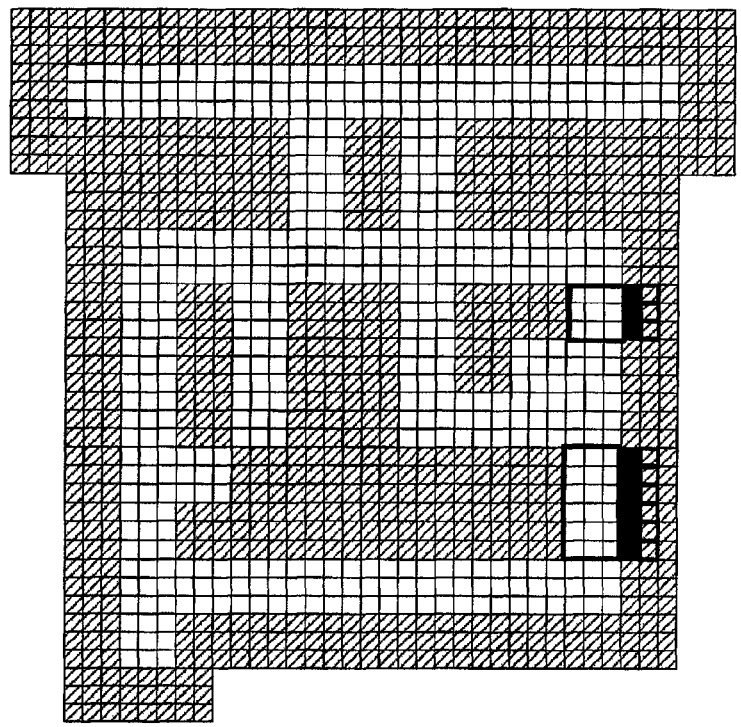
FIG. 7B illustrates how judgment is made by the thin-line blank region judging unit shown in FIG. 5.

In the example shown in FIG. 7A and FIG. 7B, regarding the edge pixels of the thin-line image portion circumscribed by the thick lines in FIG. 7A, the thin-line blank region judging unit 36 judges a blank region neighboring the edge pixels as a thin-line blank region when the distance between the edge pixels and an image region which is on the opposite side of the thin-line image portion, i.e. to the left of the edge pixels is equal to or shorter than the length equivalent to the three pixels, i.e. the second predetermined length. In the example shown in FIG. 7A and FIG. 7B, the blank region neighboring the solid edge pixels in FIG. 7B, i.e. the region circumscribed by the thick lines in the figure is judged as a thin-line blank region.

Figure 6A:
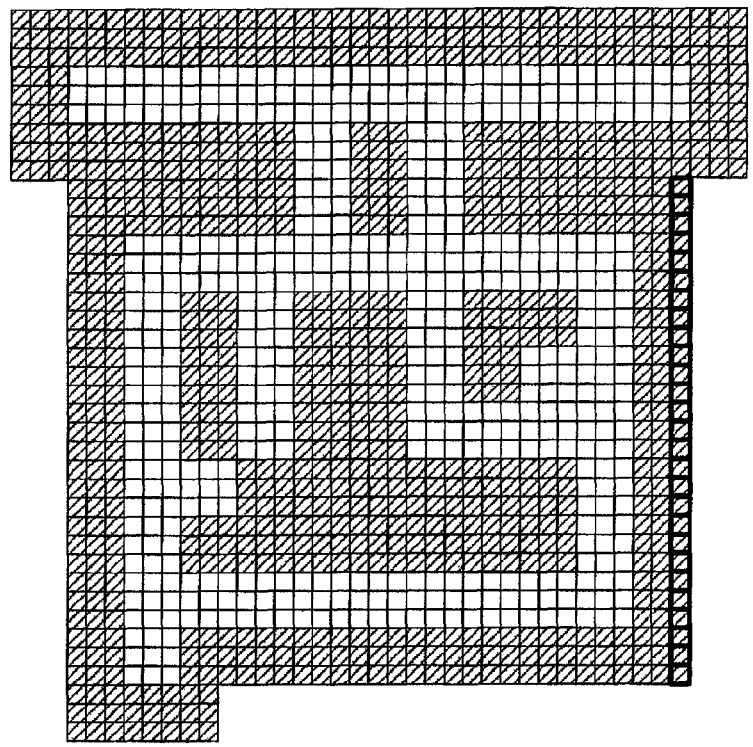
FIG. 6A illustrates how judgment is made by the thin-line image portion judging unit shown in FIG. 5.
Figure 6B:
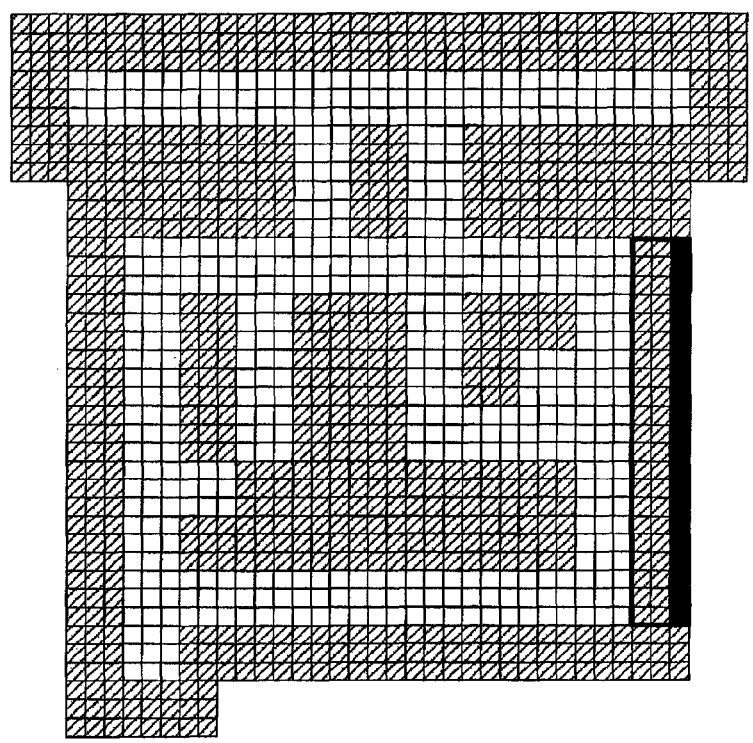
FIG. 6B illustrates how judgment is made by the thin-line image portion judging unit shown in FIG. 5.

The examples shown in FIG. 6A, FIG. 6B, FIG. 7A, and FIG. 7B describe the case where the thin-line image portion judging unit 35 and the thin-line blank region judging unit 36 make judgments regarding the successive edge pixels shown in FIG. 6A. Similar judgments are made as to all successive edge pixels in the image, with the result that thin-line image portions and thin-line blank regions are detected.

The brightness calculator 37 calculates the brightness of a thin-line image portion. In the present embodiment, based on the colors of inks ejected from the record heads 1a, the brightness of a thin-line image portion in an image formed on a sheet P is calculated. That is to say, calculated brightness decreases in the order of yellow, cyan, magenta, and black. Alternatively, the brightness may be calculated such that brightness decreases as an amount of ink ejected from the record heads 1a increases, or may be calculated based on both the colors of ink and ink amounts. The ink amount calculator 38 calculates an amount of ejected ink in each unit area of a thin-line image portion.

The processing liquid ejection judging unit 39 includes an image portion processing liquid judging unit 39a and a blank region processing liquid judging unit 39b, and judges whether to eject a processing liquid based on the ejection data of the processing liquid stored in the pre-coating data storage unit 32b. The image portion processing liquid judging unit 39a judges whether to eject a processing liquid to a region to be judged as a thin-line image portion. The blank region processing liquid judging unit 39b judges whether to eject a processing liquid to a region to be judged as a thin-line blank region. As described above, in the present embodiment, a region which is an image region where an image is to be formed. Therefore the image portion processing liquid judging unit 39a judges that a processing liquid is ejected, whereas the blank region processing liquid judging unit 39b judges that no processing liquid is ejected. In another case, when a processing liquid is ejected to not only an image region but also an outer frame region of the image region, i.e. a blank region neighboring the edge pixels, both of the image portion processing liquid judging unit 39a and the blank region processing liquid judging unit 39b judge that a processing liquid is ejected.

The bleeding degree obtaining unit 40 obtains the degree of bleeding of ink ejected to a sheet P by the record heads 1a. In the present embodiment, the degree of bleeding is obtained from the type of the sheet P which type is input by the user to either the inkjet printer 101 or the PC connected to the inkjet printer 101 by a keyboard or a mouse. Alternatively, for example, the degree of bleeding may be obtained based on a result of detection of temperature, moisture, the type of ink or the like by a sensor or the like, or based on a combination of the results of these different types of detection.

The grain direction obtaining unit 41 obtains a grain direction which is a direction of paper fibers of a sheet P. In the present embodiment, a grain direction is obtained based on the type of the sheet P that the user inputs. Alternatively, for example, a test image is printed, the image is read, and a direction to which ink bleeding spreads is selected as a grain direction.

The thin-line blank region width calculator 42 calculates the width of a thin-line blank region in the direction orthogonal to the extending direction of an edge of a thin-line image portion. That is to say, for example, the width of the thin-line blank region circumscribed by the thick lines in FIG. 7B is equivalent to three pixels.

Now, the following will describe how an amount of reduction in ejected ink is determined by the image data changing unit 33, i.e. how the number of pixels stored in the pixel storage unit 33a is determined and how the degree of change in the pixel value by the pixel value changing unit 33b is determined. First, when a region is judged as not a thin-line image portion by the thin-line image portion judging unit 35, the pixel value changing unit 33b changes the pixel value of the edge pixels which value is stored in the pixel storage unit 33a from the value corresponding to large droplets to the value corresponding to small droplets.

Furthermore, when no thin-line blank region neighbors an edge of the thin-line image portion judged by the thin-line image portion judging unit 35, the pixel value changing unit 33b changes the pixel value of the edge pixels of the thin-line image portion stored in the pixel storage unit 33a from the value corresponding to large droplets to the value corresponding to middle-sized droplets. To put it differently, in this case, as described above the extent of a change in the pixel value is small as compared to the edge pixels which are not parts of a thin-line image portion and whose value is changed to the value corresponding to small droplets.

When a thin-line blank region neighbors an edge of the thin-line image portion judged by the thin-line image portion judging unit 35 and at least one of the seven conditions below is satisfied, additional pixels are written into the pixel storage unit 33a. These additional pixels sandwich the edge pixels with the thin-line blank region in the direction orthogonal to the extending direction of the edge. In other words, in the example shown in FIG. 7B, the pixels which are on the right side of the solid pixels and are circumscribed by the thick lines are newly added to the pixel storage unit 33a. The pixel value changing unit 33b then changes the pixel value of the edge pixels in the thin-line image portion stored in the pixel storage unit 33a and of the pixels neighboring the edge pixels from the value corresponding to large droplets to the value corresponding to small droplets. On the other hand, when none of the seven conditions is satisfied, the pixel value changing unit 33b changes the pixel value of the edge pixels of the thin-line image portion and the pixel value of the pixels neighboring the edge pixels which are stored in the pixel storage unit 33a from the value corresponding to large droplets to the value corresponding to small droplets. In short, when at least one of the seven conditions is satisfied, an amount of ink ejected to an edge portion constituted by edge pixels or by edge pixels and their surrounding pixels is significantly reduced as compared to a case where none of the seven conditions is satisfied.

The aforesaid seven conditions indicate that ink is likely to bleed from a thin-line image portion to a neighboring a thin-line blank region so that the thin-line blank region is blurred, when at least one of them is satisfied. These conditions are detailed as below.

(1) The brightness of a thin-line image portion calculated by the brightness calculator 37 is equal to or lower than a predetermined threshold.

(2) An amount of ink ejected to the thin-line image portion calculated by the ink amount calculator 38 is equal to or larger than a predetermined threshold.

(3) The image portion processing liquid judging unit 39a judges that no processing liquid is ejected.

(4) The blank region processing liquid judging unit 39b judges that no processing liquid is ejected.

(5) The degree of bleeding obtained by the bleeding degree obtaining unit 40 is equal to or higher than a predetermined degree.

(6) The angle θ between the extending direction of the edge of the thin-line image portion and the grain direction obtained by the grain direction obtaining unit is equal to or larger than a predetermined threshold.

It is noted that the angle θ falls within the range of 0 degree to 90 degrees. In the present embodiment, the threshold is 45 degrees.

(7) The width of the thin-line blank region calculated by the thin-line blank region width calculator 42 is equal to or shorter than a predetermined threshold.

In the present embodiment, the threshold is the length equivalent to two pixels.

Figure 8:
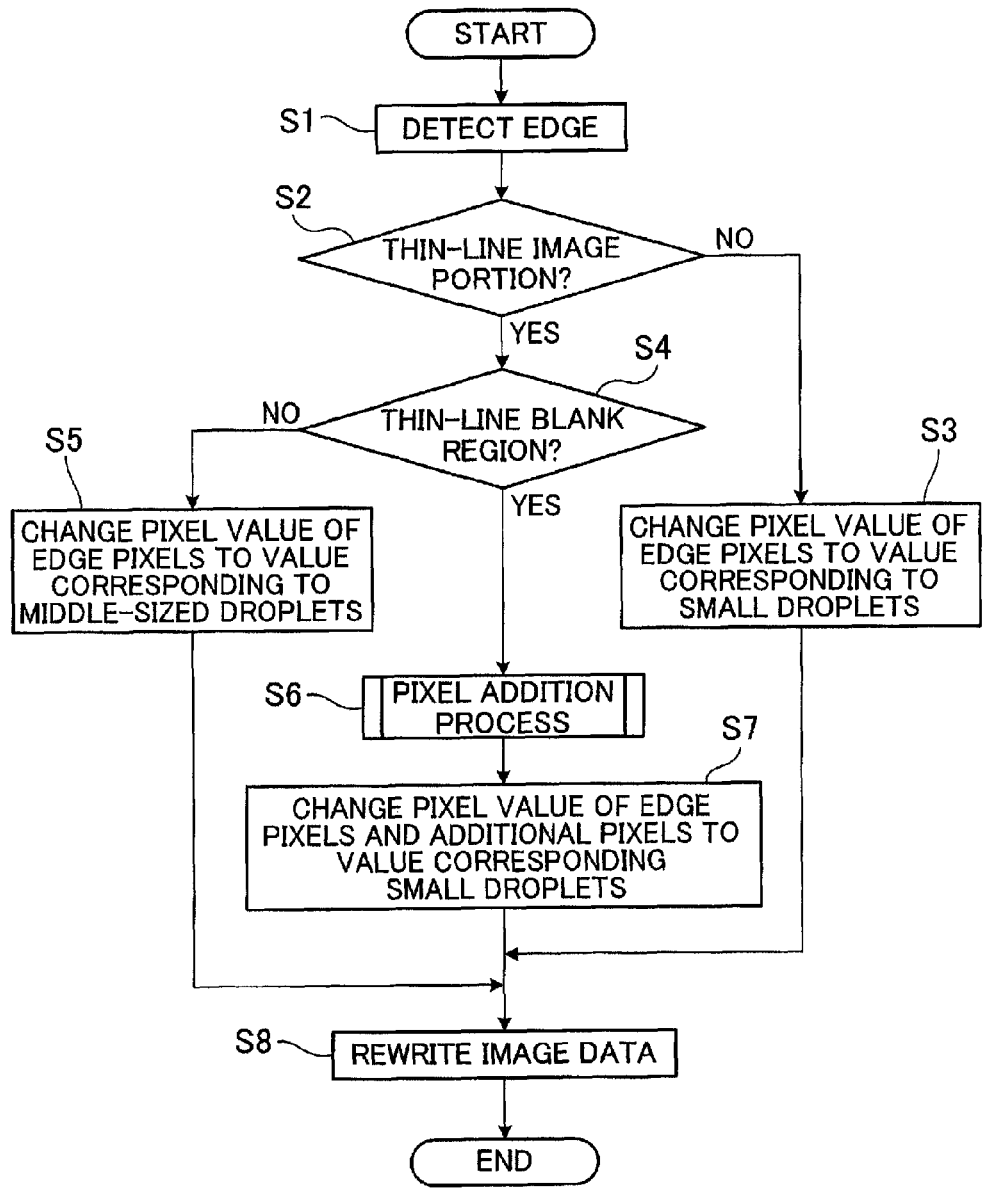
FIG. 8 is a flowchart showing an example of a process carried out by the control unit shown in FIG. 1.

Subsequently, referring to FIG. 8, an example of processing performed in the control unit 100 when an image is printed on a sheet P by the printer 101 will be described. It is noted that image data is stored in the image data storage unit 32a before the processing, and then the processing shown in FIG. 8 starts.

First, the edge detection unit 34 detects an edge of the image corresponding to the image data stored in the image data storage unit 32a (S1). Then the detected edge pixels are written into the pixel storage unit 33a. Subsequently, the thin-line image portion judging unit 35 judges whether the portion constituting the edge of the image detected by the edge detection unit 34 is a thin-line image portion (S2). when it is judged in S2 that the portion is not a thin-line image portion (S2: NO), the pixel value of the edge pixels stored in the pixel storage unit 33a is changed from the value corresponding to large droplets to the value corresponding to the small droplets (S3), and the process proceeds to later-described S8.

On the other hand, when it is judged in S2 that the region is a thin-line image portion (S2: YES), the thin-line blank region judging unit 36 judges whether a blank region neighboring an edge of the thin-line image portion is a thin-line blank region (S4). when it is judged in S4 that the blank region is not a thin-line blank region (S4: NO), the pixel value changing unit 33b changes the pixel value of the edge pixels of the thin-line image portion stored in the pixel storage unit 33a from the value corresponding to large droplets to the value corresponding to the middle-sized droplets (S5), and the process proceeds to later-described S8.

On the other hand, when it is judged in S4 that the region is a thin-line blank region (S4: YES), whether it is necessary to add pixels to be stored in the pixel storage unit 33a, i.e. the pixels whose pixel value is to be changed by the pixel value changing unit 33b. when it is judged to be necessary, a pixel addition process to write the additional pixels into the pixel storage unit 33a is carried out (S6). This pixel addition process will be detailed later. Subsequently, the pixel value changing unit 33b changes the pixel value of the edge pixels of the thin-line image portion stored in the pixel storage unit 33a and the pixel value of the pixels added in S6 from the value corresponding to large droplets to the value corresponding to small droplets (S7). Lastly, the image data rewriting unit 33c rewrites the image data stored in the image data storage unit 32a based on the storage of the pixel storage unit 33a after the change by the pixel value changing unit 33b in above-described S3, S5, or S7 (S8).

Figure 9:
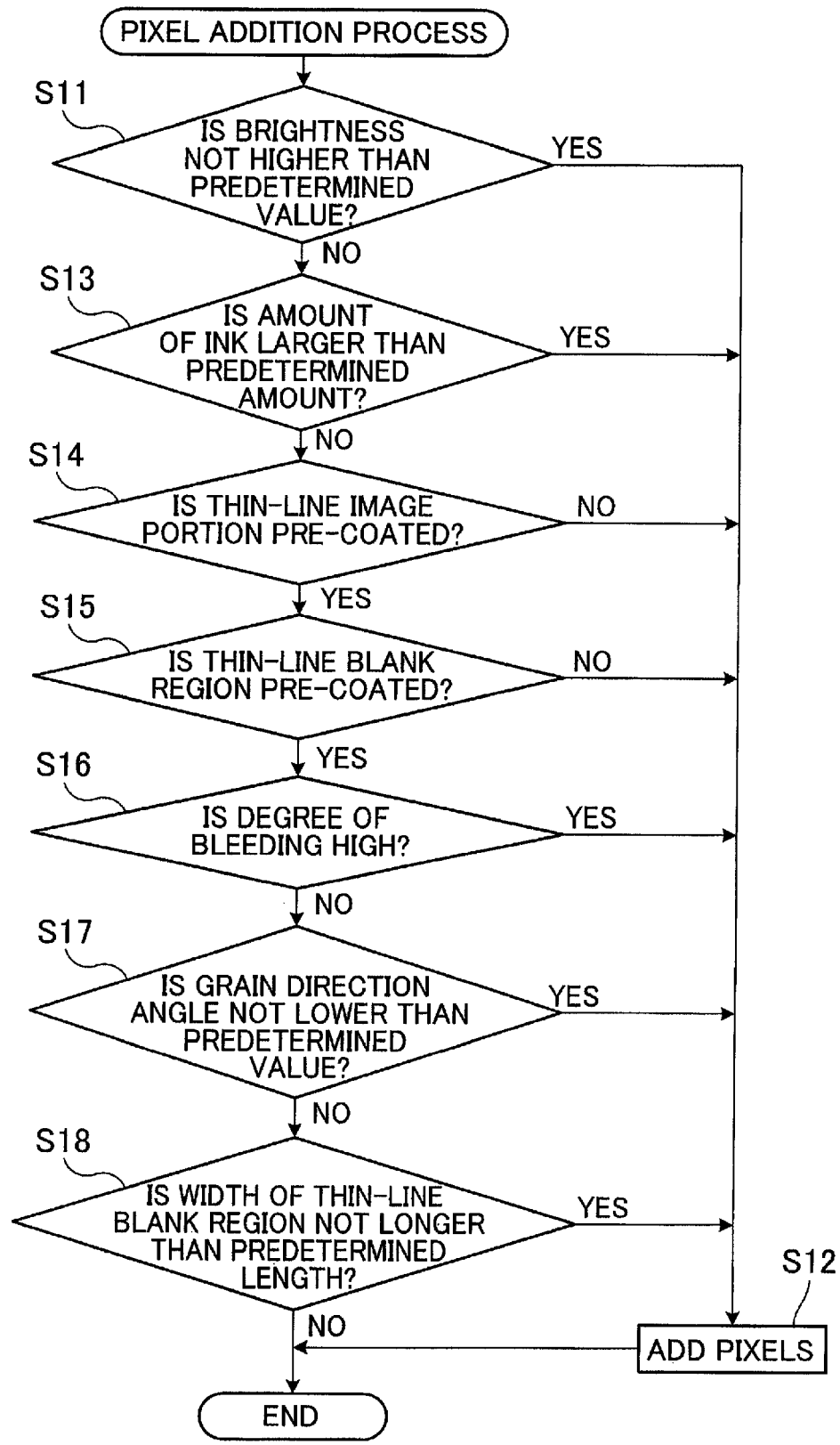
FIG. 9 is a flowchart showing the steps of a pixel addition process show in FIG. 8.

Now, referring to FIG. 9, the steps in the pixel addition process will be described. First, the brightness calculator 37 calculates the brightness of the thin-line image portion, and then whether the calculated brightness is at most equal to a predetermined threshold is judged (S11). when it is judged that the brightness is at most equal to the threshold (S11: YES), the pixels which constitute the thin-line image portion and sandwich the edge pixels with the thin-line blank region in the direction orthogonal to the extending direction of the edge are written into the pixel storage unit 33a (S12), and then the process is finished. On the other hand, when it is judged that the brightness is higher than the threshold (S11: NO), the ink amount calculator 38 calculates an amount of ink ejected onto the thin-line image portion. Then whether the calculated amount of ejected ink is at least equal to a predetermined threshold is judged (S13).

If it is judged that the amount of ejected ink is at least equal to the threshold (S13: YES), the process proceeds to the above-described S12. On the other hand, when it is judged that the amount of ejected ink is lower than the threshold (S13: NO), the image portion processing liquid judging unit 39a judges whether a processing liquid is ejected to a region to be judged as a thin-line image portion (S14).

If it is judged that no processing liquid is ejected onto the region to be judged as a thin-line image portion (S14: NO), the process proceeds to the above-described S12. On the other hand, when it is judged that a processing liquid is ejected onto the region to be judged as a thin-line image portion (S14: YES), the blank region processing liquid judging unit 39b judges whether a processing liquid is ejected onto a region to be judged as a thin-line blank region (S15).

If it is judged that no processing liquid is ejected onto the region to be judged as a thin-line blank region (S15: NO), the process proceeds to the above-described S12. On the other hand, when it is judged that a processing liquid is ejected onto the region to be judged as a thin-line blank region (S15: YES), the bleeding degree obtaining unit 40 obtains the degree of bleeding of the ink ejected onto the sheet P. Then whether the degree of bleeding is at least equal to a predetermined value is judged (S16).

If it is judged that the degree of bleeding is at least equal to the predetermined value (S16: YES), the process proceeds to the above-described S12. On the other hand, when it is judged that the degree of bleeding is lower than the predetermined value (S16: NO), the grain direction obtaining unit 41 obtains the grain direction of the sheet P. Then whether the angle θ between the extending direction of the edge of the thin-line image portion and the obtained grain direction is at least equal to a predetermined threshold is judged (S17).

If it is judged that the angle θ is at least equal to the threshold (S17: YES), the process proceeds to the above-described S12. On the other hand, when it is judged that the angle θ is smaller than the threshold (S17: NO), the thin-line blank region width calculator 42 calculates the width of the thin-line blank region. Then whether the calculated width of the thin-line blank region is at most equal to a predetermined threshold, i.e. at most equal to the length equivalent to two pixels in the present embodiment is judged (S18). In other words, whether the region whose width is not longer than the length equivalent to three pixels and which is judged as a thin-line blank region in S4 above has a particularly narrow width which is not longer than the length equivalent to two pixels.

When it is judged that the width of the thin-line blank region is at most equal to the threshold (S18: YES), the process proceeds to the above-described S12. On the other hand, when it is judged that the thin-line blank region is longer than the threshold (S18: YES), the process is finished.

As described above, the inkjet printer 101 of the present embodiment is arranged so that, when a thin-line blank region does not neighbor an edge of the thin-line image portion, the pixel value of the edge pixels of the thin-line image portion is changed from the value corresponding to large droplets to the value corresponding to middle-sized droplets. when a thin-line blank region neighbors an edge of the thin-line image portion, either the pixel value of the edge pixels of the thin-line image portion or the pixel value of the edge pixels and the pixels neighboring to the edge pixels is changed from the value corresponding to large droplets to the value corresponding to small droplets. For this reason, when no thin-line blank region neighbors an edge of a thin-line image portion, the amount of reduction in ejected ink is lower than the case where a thin-line blank region neighbors an edge of a thin-line image portion, and hence it is possible to prevent the thin-line image from thinning. When a thin-line blank region neighbors an edge of a thin-line image portion, an amount of ejected ink is significantly reduced as compared to cases where a thin-line blank region does not neighbor an edge, and it is therefore possible to prevent the thin-line blank region from being blurred on account of bleeding of dots of the thin-line image. As such, the image quality is improved.

In addition to the above, the inkjet printer 101 of the present embodiment is arranged so that, when a thin-line blank region neighbors an edge of a thin-line image portion and at least one of the seven conditions below is satisfied, not only the pixel value of the edge pixels of the thin-line image portion but also the pixel value of the pixels neighboring these edge pixels are changed from the value corresponding to large droplets to the value corresponding to small droplets.

(1) The brightness of a thin-line image portion calculated by the brightness calculator 37 is equal to or lower than a predetermined threshold.

(2) An amount of ink ejected to the thin-line image portion calculated by the ink amount calculator 38 is equal to or larger than a predetermined threshold.

(3) The image portion processing liquid judging unit 39a judges that no processing liquid is ejected.

(4) The blank region processing liquid judging unit 39b judges that no processing liquid is ejected.

(5) The degree of bleeding obtained by the bleeding degree obtaining unit 40 is equal to or higher than a predetermined degree.

(6) The angle θ between the extending direction of the edge of the thin-line image portion and the grain direction obtained by the grain direction obtaining unit is equal to or larger than a predetermined threshold.

It is noted that the angle θ falls within the range of 0 degree to 90 degrees.

The width of the thin-line blank region calculated by the thin-line blank region width calculator 42 is equal to or shorter than a predetermined threshold.

On account of the above, an amount of ink ejected onto the edge and its surroundings is further reduced when the thin-line blank region is easily blurred on account of bleeding. This makes it possible to certainly prevent the thin-line blank region from being blurred on account of bleeding.

In addition to the above, the inkjet printer 101 of the present embodiment is arranged so that the image data changing unit 33 changes the image data stored in the image data storage unit 32a so that the size of ink droplets ejected by the record heads 1a is reduced. This makes it possible to easily reduce an amount of ejected ink.

In addition to the above, the inkjet printer 101 of the present embodiment is arranged so that, in portions in the image other than the thin-line image portion, the pixel value of edge pixels is changed from the value corresponding to large droplets to the value corresponding to small droplets. This makes it possible to prevent the dots constituting an edge from bleeding in the portions other than the thin-line image portion, thereby improving the image quality.

In the embodiment above, an amount of ejected ink is reduced by changing the pixel value of pixels around an edge is changed from the value corresponding to large droplets to the value corresponding middle-sized droplets or small droplets. Alternatively, an amount of ejected ink may be reduced by reducing the number of dots formed around the edge. In addition to the above, the embodiment above is arranged so that three types of droplets, i.e. large droplets, middle-sized droplets, and small droplets are ejected. Alternatively, more than three types of droplets may be ejected.

In addition to the above, the embodiment above describes a case where, when a thin-line blank region does not neighbor an edge of a thin-line image portion, the pixel value of the edge pixels of the thin-line image portion is changed from the value corresponding to large droplets to the value corresponding to middle-sized droplets. The present invention, however, is not limited to this arrangement. As long as an amount of reduction in ejected ink when a thin-line blank region neighbors an edge of a thin-line image portion is larger than the amount in a case where a thin-line blank region does not neighbor an edge, any arrangements may be adopted. For this reason, an amount of ink may not be reduced at all when a thin-line blank region does not neighbor an edge.

In addition to the above, the embodiment above is arranged so that, when a thin-line blank region neighbors an edge of a thin-line image portion, the number of pixels whose pixel value is changed from the value corresponding to large droplets to the value corresponding to small droplets is increased when at least one of seven conditions with which the thin-line blank region is easily blurred due to the ink bleeding from the neighboring thin-line image portion is satisfied. The present invention, however, is not limited to this arrangement. For example, an amount of ejected ink droplets may be further reduced when at least one of the conditions is satisfied.

In addition to the above, the embodiment above describes a case where the image data changing unit 33 reduces an amount of ink ejected onto edge pixels or onto edge pixels and their neighboring pixels. The present invention, however, may be arranged so that the area where ink ejection amount is reduced around the edge portion may be enlarged in accordance with the degree of blurring of the thin-line blank region.

In addition to the above, the embodiment above describes a case where an amount of ink ejected onto edge portions other than a thin-line image portion in an image is also reduced. Alternatively, an amount of ink may not be reduced in portions other than a thin-line image portion.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An image recording apparatus comprising:
   an image data storage unit which stores image data regarding an image recorded on a recording medium;
   a record head which records the image by ejecting recording droplets onto the recording medium;
   a head controller which controls ejection of the recording droplets from the record head based on the image data stored in the image data storage unit so that image dots are formed as the recording droplets are ejected onto the recording medium;
   an image data changing unit which changes the image data stored in the image data storage unit so that an amount of the ejected recording droplets is reduced;
   an edge detection unit which detects an edge of the image concerning the image data;
   a thin-line image portion judging unit which judges that a portion in the image which portion is not wider than a first predetermined length in a direction orthogonal to an extending direction of the edge detected by the edge detection unit is a thin-line image portion; and
   a thin-line blank region judging unit which judges that a blank region which neighbors an edge of the thin-line image portion and does not receive the recording droplets is a thin-line blank region when the blank region is not wider than a second predetermined length in a direction orthogonal to the extending direction of the edge of the thin-line image portion, wherein,
   the image data changing unit changes the image data such that an amount of reduction in the recording droplets ejected onto a region including a dot region where the image dots constituting at least the edge of the thin-line image portion are formed is large when the thin-line image portion neighbors the thin-line blank region, as compared to a case where the thin-line image portion does not neighbor the thin-line blank region.

2. The image recording apparatus according to claim 1, further comprising:
   a brightness calculator which calculates the brightness of the thin-line image portion, wherein,
   the image data changing unit changes the image data such that, regarding the thin-line image portion neighboring the thin-line blank region, an amount of the recording droplets ejected onto a region including the dot region where the image dots constituting at least the edge of the thin-line image portion are formed is reduced more as the brightness of the thin-line image portion calculated by the brightness calculator decreases.

3. The image recording apparatus according to claim 1, further comprising:
   a recording droplet ejection amount calculator which calculates an amount of the ejected recording droplets per unit of area in the thin-line image portion, wherein,
   the image data changing unit changes the image data such that, regarding the thin-line image portion neighboring the thin-line blank region, an amount of the recording droplets ejected onto a region including the dot region where the image dots constituting at least the edge of the thin-line image portion are formed is reduced more as the amount of the ejected recording droplets calculated by the recording droplet ejection amount calculator increases.

4. The image recording apparatus according to claim 1, further comprising:
   a processing liquid ejection head which ejects a processing liquid onto the recording medium, the processing liquid quickening fixing of the recording droplets onto the recording medium;
   a processing liquid ejection data storage unit which stores ejection data regarding ejection of the processing liquid; and
   a first processing liquid ejection judging unit which judges whether the processing liquid is ejected onto a region on the recording medium in which region the thin-line image portion is recorded, based on storage of the processing liquid ejection data storage unit, wherein,
   the image data changing unit changes the image data such that, regarding the thin-line image portion neighboring the thin-line blank region, an amount of the recording droplets ejected onto a region including the dot region where the image dots constituting at least the edge of the thin-line image portion are formed is reduced more when the first processing liquid ejection judging unit judges that the processing liquid is not ejected, as compared to a case where the first processing liquid ejection judging unit judges that the processing liquid is ejected.

5. The image recording apparatus according to claim 4, further comprising:
   a second processing liquid ejection judging unit which judges whether the processing liquid is ejected to a region which is to be judged as the thin-line blank region on the recording medium, based on the storage of the processing liquid ejection data storage unit, wherein,
   the image data changing unit changes the image data such that, regarding the thin-line blank region neighboring the thin-line image portion, an amount of reduction in the recording droplets ejected onto a region including the dot region where the image dots constituting at least the edge of the thin-line image portion are formed is large when the second processing liquid ejection judging unit judges that the processing liquid is not ejected, as compared to a case where the second processing liquid ejection judging unit judges that the processing liquid is ejected.

6. The image recording apparatus according to claim 1, further comprising:
   a bleeding degree obtaining unit which obtains a degree of bleeding of the recording droplets ejected onto the recording medium by the record head, wherein, the image data changing unit changes the image data such that, regarding the thin-line image portion neighboring the thin-line blank region, an amount of the recording droplets ejected onto a region including the dot region where the image dots constituting at least the edge of the thin-line image portion are formed is reduced more as the degree of bleeding obtained by the bleeding degree obtaining unit increases.

7. The image recording apparatus according to claim 1, wherein, the recording medium is a paper medium, a grain direction obtaining unit which obtains a direction of fibers of the paper medium is further provided, and the image data changing unit changes the image data such that, regarding the thin-line image portion neighboring the thin-line blank region, an amount of the recording droplets ejected onto a region including the dot region where the image dots constituting at least the edge of the thin-line image portion are formed is reduced more as an angle θ between the extending direction of the edge of the thin-line image portion and the direction of fibers obtained by the grain direction obtaining unit increases, the angle θ falling within a range of 0 degree to 90 degrees.

8. The image recording apparatus according to claim 1, further comprising:

a thin-line blank region width calculator which calculates the width of the thin-line blank region, wherein, the image data changing unit changes the image data such that, regarding the thin-line image portion neighboring the thin-line blank region, an amount of the recording droplets ejected onto a region including the dot region where the image dots constituting at least the edge of the thin-line image portion are formed is reduced more as the width of the thin-line blank region calculated by the thin-line blank region width calculator decreases.

9. The image recording apparatus according to claim 1, wherein, the image data changing unit changes the image data such that sizes of the image dots formed by the recording droplets ejected from the record head are decreased.

10. The image recording apparatus according to claim 1, wherein, the image data changing unit changes the image data concerning at least the edge of the image, when the thin-line image portion judging unit judges that the region in the image is not a thin-line image portion.

11. A computer program product stored on a computer readable medium, which product is run on a computer controlling an image recording apparatus including:

an image data storage unit which stores image data regarding an image recorded on a recording medium;

a record head which records the image by ejecting recording droplets onto the recording medium; and a head controller which controls ejection of the recording droplets from the record head based on the image data stored in the image data storage unit so that image dots are formed as the recording droplets are ejected onto the recording medium, the computer program product causing the computer to function as:

an image data changing unit which changes the image data stored in the image data storage unit so that an amount of the ejected recording droplets is reduced;

an edge detection unit which detects an edge of the image concerning the image data;

a thin-line image portion judging unit which judges that a portion in the image which portion is not wider than a first predetermined length in a direction orthogonal to the extending direction of the edge detected by the edge detection unit is a thin-line image portion; and a thin-line blank region judging unit which judges that a blank region which neighbors an edge of the thin-line image portion and does not receive the recording droplets is a thin-line blank region when the blank region is not wider than a second predetermined length in a direction orthogonal to the extending direction of the edge of the thin-line image portion, wherein, the image data changing unit changes the image data such that an amount of reduction in the recording droplets ejected onto a region including a dot region where the image dots constituting at least the edge of the thin-line image portion are formed is large when the thin-line image portion neighbors the thin-line blank region, as compared to a case where the thin-line image portion does not neighbor the thin-line blank region.

\* \* \* \* \*